United States Patent [19]

Williams

[11] Patent Number: 4,802,023

[45] Date of Patent: Jan. 31, 1989

[54] SYSTEM FOR READING AND WRITING VERTICAL INTERVAL TIME CODE

[75] Inventor: Marshall Williams, Fremont, Calif.

[73] Assignee: Ampex Corporation, Redwood City, Calif.

[21] Appl. No.: 899,286

[22] Filed: Aug. 21, 1986

[51] Int. Cl.⁴ .............................................. G11B 27/02
[52] U.S. Cl. .................................. 360/14.3; 360/13; 360/72.1; 360/72.2
[58] Field of Search ............... 360/14.3, 37.1, 72.1, 360/72.2, 14.2, 13; 358/339, 311

[56] References Cited

U.S. PATENT DOCUMENTS

| | | | |
|---|---|---|---|
| 4,134,130 | 1/1979 | Tachi | 360/37.1 |
| 4,167,028 | 9/1979 | Tobey | 360/14.3 X |
| 4,329,719 | 5/1982 | Ninomiya | 360/14.3 X |
| 4,394,694 | 7/1983 | Ninomiya et al. | 360/14.3 |
| 4,486,780 | 12/1984 | Irie | 358/339 X |
| 4,567,531 | 1/1986 | Tabata | 360/37.1 X |
| 4,663,679 | 5/1987 | Sekiguchi et al. | 360/14.3 X |

OTHER PUBLICATIONS

"The TR-800 VTR A Computer-Based Total System Design"; Hedlund, International Broadcast Engineer/-Mar. 1981, pp. 18–26.

"Time Code Error Correcting Utilizing A Microprocessor"; Bates et al., SMPTE, Journal, Oct. 1979, vol. 88, pp. 712–714.

"Implementation of Time Code Using Pakikode® Magnetic Control Surface Film"; Compton et al.; SMPTE, Journal, Jul. 1986, pp. 727–732.

Stan Busby et al., *Video Tape Recording*, Ampex Corporation, 1986, pp. 141–143.

Primary Examiner—Aristotelis M. Psitos
Attorney, Agent, or Firm—Robert E. Krebs; Bradley A. Perkins; George B. Almeida

[57] ABSTRACT

A system for editing videotape includes a subsystem to scan particular information lines within vertical blanking intervals and to identify particular lines that contain time code information, and a subsystem to generate time code information and to write the generated time code information at selected lines in vertical blanking intervals.

14 Claims, 3 Drawing Sheets

FIG_1

FIG_2

SYSTEM FOR READING AND WRITING VERTICAL INTERVAL TIME CODE

BACKGROUND OF THE INVENTION

1. Field of the Invention

The present invention relates to a method and system for manipulating information on videotapes and, more particularly, to a method and system for reading and controllably recording data on videotape, such as vertical interval time code information, that is especially useful when editing videotapes.

2. State of the Art

In modern videotape recording technology, it is commonplace to extensively edit videotapes. In practice, editing processes are usually described as being either "insert" or "assemble" operations. In an insert operation, new information on videotape is spliced into the midst of existing information. In an assemble operation, new information on videotape is added at the end of other information. In either editing operation, it is desirable that editing orientation information on videotape is consistent before and after edit transitions.

Storage of editing orientation information on videotapes can be provided in so-called "vertical blanking intervals." Normally, vertical blanking intervals correspond to the time required by cathode ray emitters to "return scan" from the bottom to the top of a screen; during return scan periods, the cathode ray scanners do not produce luminescence on the screen. Because television signals are transmitted continuously but the operation of cathode ray emitters is discontinuous, the return scan periods are appropriately referred to as vertical blanking intervals. In modern practice, vertical blanking intervals may include twenty or more lines that contain signal information such as video captions for hearing-impaired individuals and, most importantly for present purposes, vertical interval time code (VITC) information.

VITC information is normally recorded in vertical blanking intervals to identify the time at which a particular frame occurs after a frame identified as "frame zero". (Frame zero often, but not necessarily, coincides with the beginning of a recording.) For example, the 2055th frame following frame zero might be designated as 00:01:08:15, indicating that the frame follows frame zero by 1 minute and 8.5 seconds when the tape is played at a normal operating speed of thirty frames per second; that is, the first two digits in this code designate hours in decimal notation, the next two digits designate minutes, the next two digits designate seconds, and the final two digits designate numbers of frames, Providing VITC information is, therefore, tantamount to identifying video frames by addresses sequential from frame to frame.

In practice, VITC information is similar to well known longitudinal time code information except it contains one "sign" bit that identifies which interlaced field of video information the time code information is extracted from.

Precise code formats for VITC information have been specified by standards, such as ANSI/SMPTE 12M-1986 sponsored by the American National Standards Institute (New York, NY) and by the Society of Motion Picture and Television Engineers. In this standard format, VITC information comprises 90 digital bits consisting of 9 bytes with two synchronizing bits between each byte encoded into a line of video information; included within the 90 bits are two initial synchronizing bits and eight cyclical redundancy check code (CRC) bits at the end of the line. Other standard code formats for VITC information exist, however, in addition to the American National Standard; for example, the European Broadcaster's Union standard sets forth a somewhat different format for VITC code information. Typically under the various standards, VITC information is recorded redundantly on only two non-adjacent lines in a vertical blanking interval, and is identified as VITC information by unique synchronizing bit sets embedded in the information.

Although standards specify code formats for VITC information, the standards provide substantial flexibility as to placement of VITC information in vertical blanking intervals. Consequently, in videotape editing, selection of placement of VITC information is a matter of choice with individual editors, and actual line placement of VITC information may differ from machine to machine or from editor to editor. For example, one editor may choose to record VITC information on the 13th and 15th lines in vertical blanking intervals, and another may elect to record VITC information on the 17th and 19th lines.

Although flexibility as to placement of VITC information in vertical blanking intervals is highly desirable for some editing purposes, the flexibility can cause problems when videotapes are re-edited or replayed. In part, such problems arise because conventional devices for reading VITC information from videotape, usually called "VITC readers", do no provide identification of addresses of lines from which VITC information is read. In the absence of such address information, it is conventional editing practice to arbitrarily choose line addresses to record VITC information without regard for line addresses at which VITC information may have been previously recorded on the videotape being edited. Thus, in conventional practice, the location of VITC information in terms of line addresses is highly unpredictable. One complication arising from such practice is that, during editing, VITC information may be recorded over important non-VITC information in vertical blanking intervals. For instance, an editor may inadvertently write VITC information over closed captioned information, causing loss or distortion of captions during replay of edited videotape.

In view of the preceding, it can be appreciated that instances may exist where previously recorded VITC information co-exists with newly recorded VITC information on an edited videotape; for example, previously recorded VITC information may appear on the 13th and 15th lines in vertical blanking intervals of an edited videotape and newly recorded VITC information may be recorded on the 17th and 19th lines of the same tape. This can cause difficulties during editing because conventional VITC readers locate only the first valid line of VITC information in vertical blanking intervals and ignore all subsequent lines. Thus, when re-editing a videotape, inconsistencies may occur if a VITC reader should sometimes miss the newly recorded VITC information and, instead, read the originally recorded information; it is also possible that a VITC reader might at times read the newly recorded VITC information and, at other times, read the previously recorded VITC information.

Further with regard to the state of the art, it should be understood that conventional devices exist for assuring that newly recorded VITC information is numerically-sequential with previously recorded VITC information across edit transitions. Such devices simplify editing tasks, because the sequential VITC information conveniently guides an editor to a desired point on an edited videotape.

BRIEF SUMMARY OF THE INVENTION

The present invention provides substantial improvements in the state of the art of manipulation of information stored on videotape and is especially useful for videotape editing. Particularly, the present invention provides a system that assures that data on videotape, especially numerically-sequential VITC information, can be written on the same lines in vertical blanking intervals as the information is extracted from. Thus, the present invention can substantially enhance convenience in videotape editing and, moreover, can assure that valuable information stored on videotape is not lost during editing. As a specific example, the present invention can preclude the possibility that VITC information is recorded over information such as closed captioned information in vertical blanking intervals and, thereby, can preclude loss or distortion of closed captions during replay of edited videotape. As another specific example of its benefits, the present invention can preclude previously-recorded VITC information from coexisting with newly recorded VITC information but on different lines after an edit transition. As yet another specific example, the present invention permits convenient identification of particular lines in video fields, particularly specific lines in vertical blanking intervals, in which specific data such as VITC information is stored. This capability is beneficial in providing editors with enhanced control of editing processes to avoid difficulties that occur in conventional editing practice because of inconsistencies in locating VITC information.

To provide the preceding benefits and others, the preferred embodiment of the present invention provides a means to select a particular line within a video field such as a vertical blanking interval; a scanning means to scan only the particularly selected line; and a detector means to detect whether the scanned line contains vertical interval time code information. As adapted to editing processes relating to the placement of VITC information in vertical blanking intervals, the preferred embodiment of the present invention further provides generator means to generate time code information numerically-sequential with time code information detected on said scanned line, and writing means to write numerically-sequential time code information in vertical blanking intervals on the lines that were detected to contain vertical interval time code information.

Further, a specific embodiment of the present invention that is especially useful for videotape editing provides a process comprising the steps of scanning particularly selected information lines within vertical blanking intervals, identifying a particular line that contains VITC information, generating time code information and writing the generated time code information in vertical blanking intervals on selected lines.

The foregoing advantages and other aspects of the present invention can be readily ascertained by reference to the following description and attached drawings which illustrate a preferred embodiment.

DETAILED DESCRIPTION OF THE PREFERRED EMBODIMENT

Figure 1:
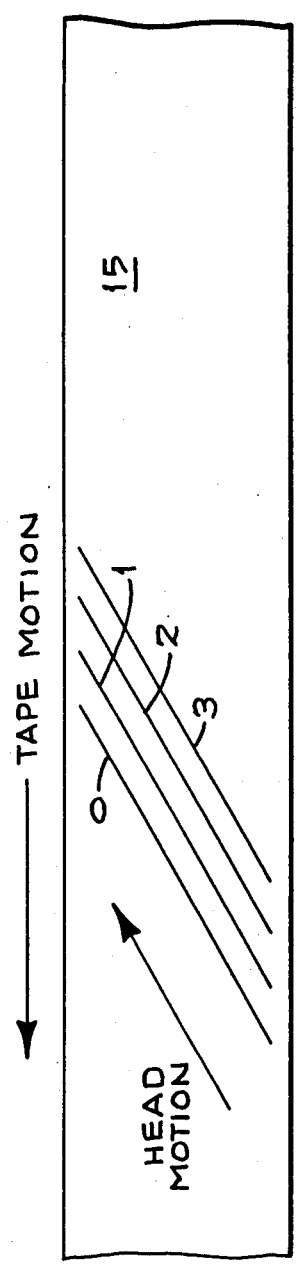
FIG. 1 is a schematic view of a videotape having information magnetically recorded thereon in one relatively simple format.

An environment of the present invention may be appreciated by referring to FIG. 1 which shows a section of videotape 15 whose forward direction of motion through a video record-and-playback machine is indicated by the horizontal arrow parallel to the longitudinal centerline of the tape. On videotape 10, tracks 0, 1, 2, etc., of magnetically recorded information include data to replicate recorded images on a cathode ray tube (CRT) screen. Thus, a display on a CRT screen can be considered to be a pattern comprised of sets of horizontal lines of ordered luminescent points controllably varied according to information stored on information tracks 0, 1, 2, etc. For purposes of the present invention, however, the particular format in which information is organized on videotape is not critical.

Figure 2:
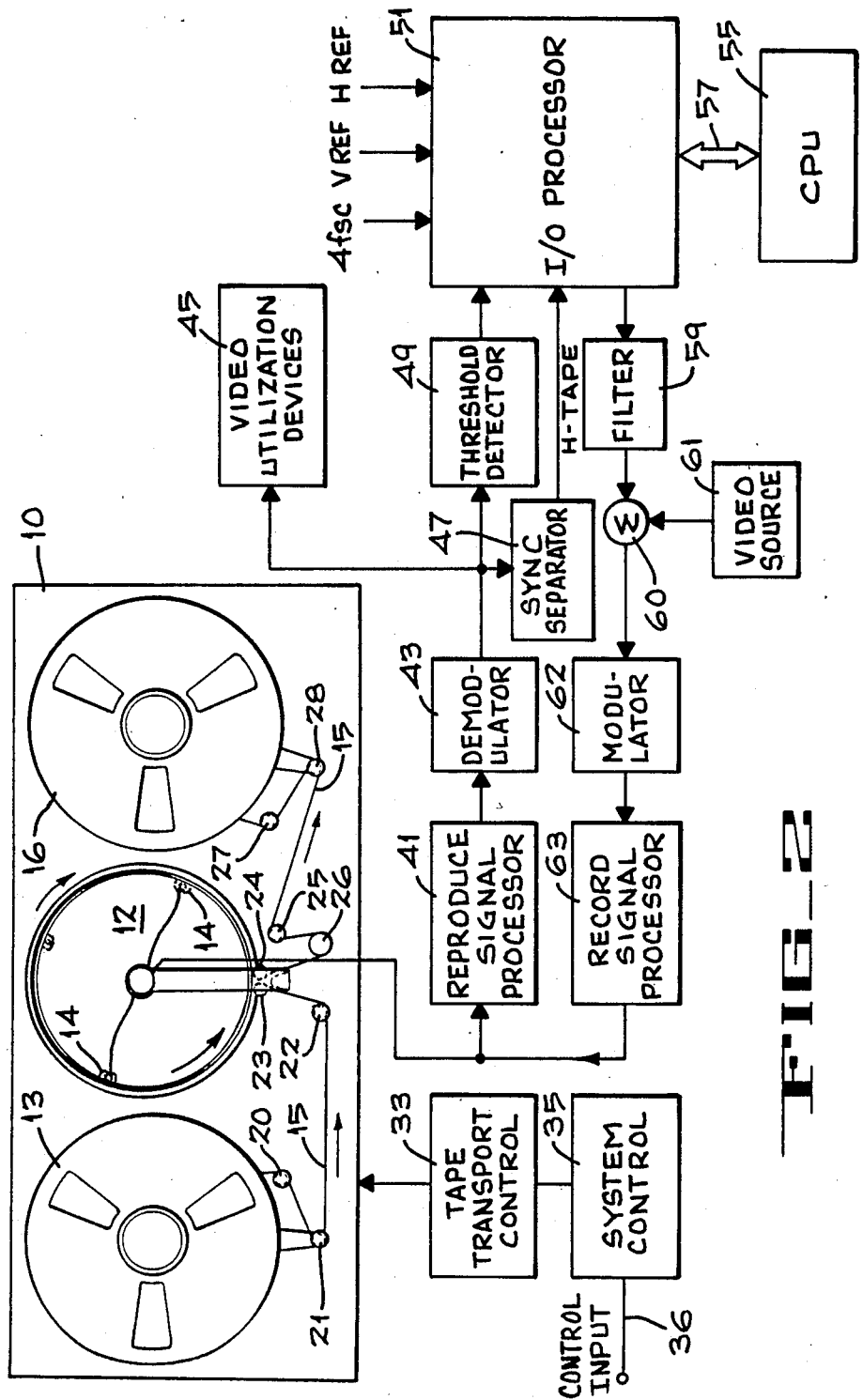
FIG. 2 is a functional block diagram of a vertical interval time code integration system according to the present invention.

FIG. 2 generally shows components of a system for conveniently recording and reproducing data, especially numerically-sequential VITC information, on certain selected lines in vertical blanking intervals. In FIG. 2, a conventional videotape transport machine 10 includes a rotatable drum guide and scanning head 12, a videotape supply reel 13, and a videotape take-up reel 16. Scanning head 12 includes read/write transducers 14 that selectively read or write, or both, information on videotape 15. Various guides 20–28 are provided to guide and tension videotape 15 along its path of travel from supply reel 13 to head 12, and then to take-up reel 16.

In the system of FIG. 2, tape transport machine 10 is controlled by tape transport control 33 which, in turn, is controlled by system control 35. Tape transport 10 operates in response to control input signals on line 36 as interpreted by control system 35 and implemented by tape transport control component 33. In practice, the velocity and direction of a capstan 26, supply reel 13, and take-up reel 14, are controlled so that various tape velocities, in either the forward or reverse direction, are obtained to selectively operate tape transport machine 10 in a play mode, a stop mode, or a shuttle mode. In play mode, the direction of the tape is forward (as indicated by the arrows) and tape velocity equals the velocity at which video information was originally recorded on the tape. In the stop mode, videotape velocity is zero but scanning head 12 can be operational to read video information from tape 15. Shuttle mode is used for accelerated movement of the tape 15 in either direction, usually at velocities up to about fifty times normal play velocity. The tape transport machine 10, tape transport control 33, and system control 35 are all conventional and well known to those skilled in the art. Control input signals on line 36 can originate at an operator control panel or from a video editor.

The system in FIG. 2 further generally includes subsystem components to control machine 10 to read information on selected lines in vertical blanking intervals.

The reading subsystem includes conventional components such as a reproduce signal processor 41 connected to read/write heads 14 to receive information written in vertical blanking intervals. Reproduce signal processor 41 operates upon signals read from videotape and performs a number of conventional operations to prepare the signals for demodulation. Such processors are well known to those skilled in the art of video signal processing. Demodulator 43 operates upon output signals from processor 41 to produce a standard video signal. Demodulators are also well known to those skilled in the video signal processing art. The standard video signals provided by demodulator 43 are suitable for use by video utilization devices 45 such as CRT monitors or videotape record-and-playback machines. Output signals from demodulator 43 are also provided to a sync separator 47 of conventional design that separates synchronizing information, such as vertical synchronizing information and a horizontal synchronizing signal referred to herein as $H_{tape}$, from the demodulated signals.

Further in the system of FIG. 2, signals from demodulator 43 are processed by a threshold detector 49. Generally speaking, threshold detector 49 is of conventional design to provide a first constant output if input signal amplitude exceeds a certain reference level, and a second constant output if input signal amplitude is below the pre-selected level. The reference level of threshold detector 49 is, in practice, selected to distinguish VITC information from other information. Threshold detector 49 can be equivalently described as being a "one-bit analog-to-digital converter" since its output is a stream of binary data pulses selectively representative of the amplitude of input signals.

The output of threshold detector 49 is provided to an input and output (I/O) processor 51 that also receives the $H_{tape}$ signal. I/O processor 51 includes an array of registers and other conventional digital memory and logic elements to manipulate binary information in response to command signals from a central processing unit (CPU) 55 that is connected in communication with I/O processor 51 via a bi-directional data buss 57. In practice, CPU 55 is a conventional microprocessor that performs arithmetical logic operations on data in selected registers of I/O processor 51 under software control.

As further shown in FIG. 2, I/O processor 51 receives reference signals $H_{ref}$, $V_{ref}$ and 4 fsc. These reference signals differ from $H_{tape}$ in that they do not originate with information on videotape as does the $H_{tape}$ signal. The $H_{ref}$ signal is periodic with a frequency corresponding to the ideal frequency of the horizontal synchronizing signal included in color television signals, (i.e., 15,734 hertz). Similarly, the $V_{ref}$ signal corresponds with the ideal frequency of vertical sunchronizing signals included in color television signals (i.e., 59.94 hertz). the 4 fsc signal, herein called "fast clock" signals, is four time the frequency of color subcarrier signals in color television signals and has a frequency of about 14.3 mega-hertz.

The system of FIG. 2 further includes components to record output signals from I/O processor 51 onto videotape 15. In the recording subsystem, output signals from I/O processor 51 are provided to a filter 59. Filter 59 converts the digital output signals from I/O processor 51 to the proper shape as defined in the applicable standard. The filtered signal is then conveyed to a summer circuit 60 where signals from a video source 61 are added to the filtered signal. Then, the composite signal is fed to a modulator 62 and to a signal processor 63 for conversion to the proper level and equalization for recording on videotape 15 via read/write heads 14. The components in the recording subsystem are conventional and perform functions that are substantially the converse of functions performed by analogous components in the reading subsystem.

Figure 3:
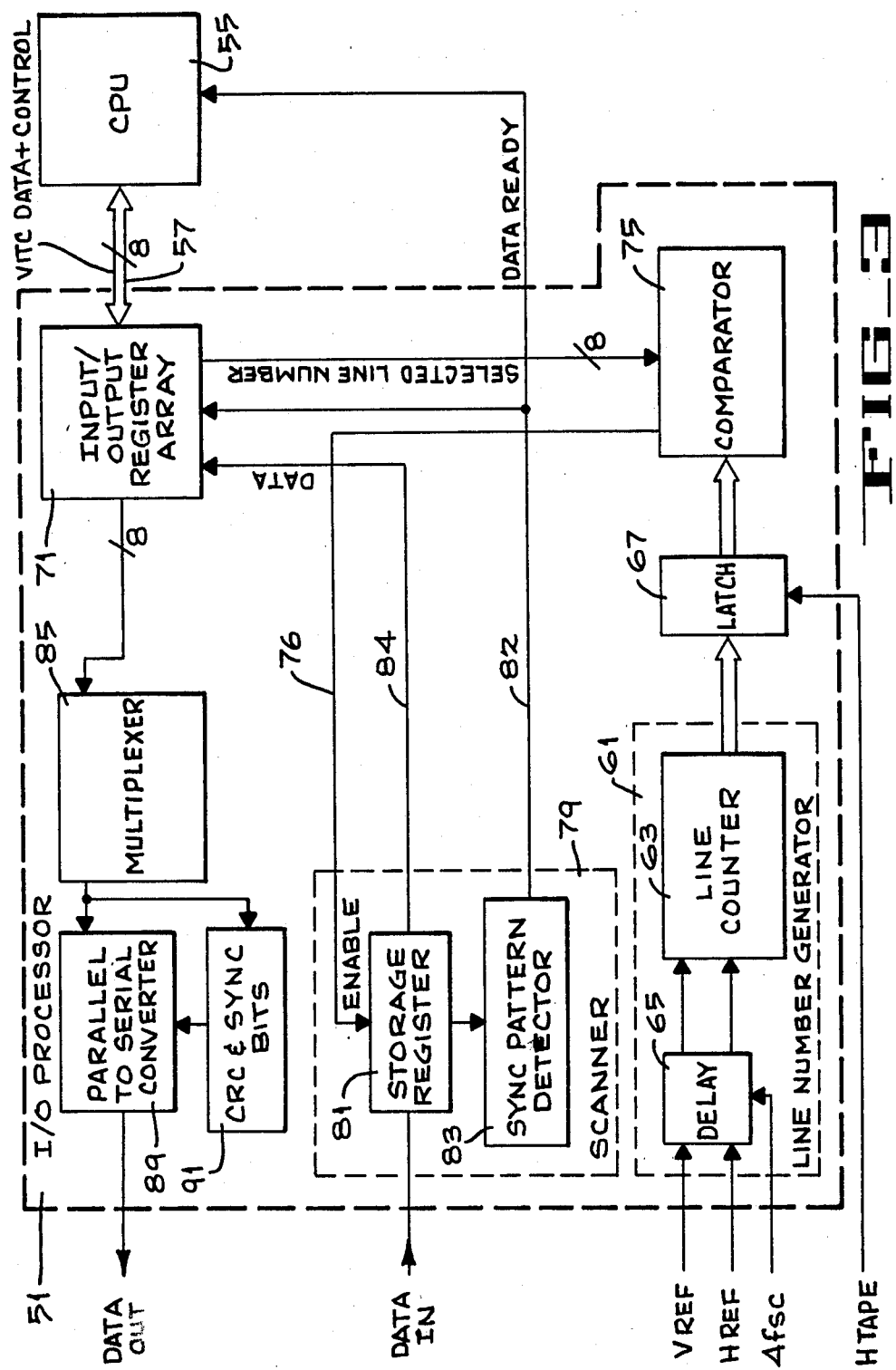
FIG. 3 is a functional block diagram that illustrates details of a component of the system of FIG. 2.

Referring now to FIG. 3, I/O processor 51 is provided to detect data, such as VITC information, encoded on identified lines in vertical blanking intervals. Reference signals $V_{ref}$, $H_{ref}$, and 4 fsc are utilized in a line number generator 61 to generate vertical blanking interval (VBI) line numbers for use in I/O processor 51. Generator 61 includes a digital counter 63 that, via delay 65, employs the $V_{ref}$ signal for reset, the $H_{ref}$ signal for clocking and the 4fsc signal for delay. In practice, digital counter 63 produces an output count that leads the expected time of arrival of a line that is read from videotape by one-half line. To provide synchronization of the advanced one-half line count with information actually read from videotape, the VBI line numbers produced by generator 61 are latched at latch 67 by the $H_{tape}$ signal. To provide the specified functions, digital counter 63 and latch 67 can be of conventional design.

As further shown in FIG. 3, a comparator 75 receives output signals from line-number generator 61 and from I/O register array 71. The latter signal is designated as the "selected line number" signal. Although the selected line number signal is shown as an output from I/O register array 71, it is actually determined by CPU 55 under conventional software control. (That is, CPU 55 provides a sequence of video line numbers in a defined and ordered manner, and at a defined rate, under conventional software control.) The output of comparator 75 on line 76 is labeled as the "read gate enable" signal and is generated by comparator 75 if, and only if, a selected line number corresponds to the line number provided by generator 61. That is, comparator 75 compares two input line numbers and provides a read gate enable signal only when the input line numbers are identical.

Still further in the system of FIG. 3, the read gate enable signal is transmitted to a scanner 79 comprised of a storage register 81 and a pattern detector 83. The other input signal to scanner 79 is a DATA signal, normally VITC information, read from videotape 15. In practice, storage register 81 is a 90-bit shift register of conventional design that is enabled by the read gate enable signal on line 76. (That is to say, register 81 will store an INPUT signal only when it concurrently receives a gate enable signal.) In scanner 79, pattern detector 83 is a comparator of conventional design that is connected to register 81 to detect whether certain synchronizing information is embedded in information held in register 81. In preferred practice, pattern detector 83 determines whether stored DATA information contains synchronizing information unique to VITC information. Thus, pattern detector 83 can be described as identifying valid data, and an output on line 82 can be called a "data ready" signal. (As will become clear in the discussion that follows, a data ready signal on line 82 indicates that a read operation has been successfully completed and that reading of data out of I/O register array 71 can commence.) The data ready signal on line 82 is provided to I/O register array 71 and initiates transfer of data from storage register 81 to the output registers of array 71 via line 84.

Other components of I/O processor 71 include a multiplexer 85 connected to the output of I/O register array 71, a parallel-to-serial converter 89, and a generator 91 for generating CRC and sync bits. Together these components operate upon the output of I/O processor 71 to provide a signal that is suitable for processing by filter 59 and the other components in the writing subsystem of FIG. 2, with the finally processed signal being suitable to be written on videotape by components in FIG. 2.

The complete operation of the system of FIGS. 2 and 3 will now be described. Initially, it should be assumed that tape transport machine 10 is placed in operation by control 33 so that videotape is transported in the rewind direction. Consequently if operation is initiated at an edit transition, machine 10 will "back up" from the transition and then will read videotape prior to the transition. (This operation is often referred to as "pre-roll".) As videotape 15 is read during a pre-roll operation, information in vertical blanking intervals is read by read/write heads 14 and is processed by signal processor 41, demodulator 43, threshold detector 49 and sync separator 47. Their resultant signals are provided to I/O processor 51.

Also when record-and-playback machine 10 is in the pre-roll playback mode, the $H_{tape}$ signal is read from videotape 15. The $H_{tape}$ signal is utilized at latch 67 in conjunction with the output of line number generator 61. In generator 61, line counter 63 employs the reference signals $V_{ref}$, $H_{ref}$ and 4 fsc to generate VBI line numbers in advance of the time of expected arrival of off-tape line numbers by a period equal to about one-half of the period of a horizontal line. Then, the generated VBI line numbers are synchronized in time wth information actually being read from videotape by latching the output of line number generator 61 with the $H_{tape}$ signal read from videotape. The synchronized VBI line number is then compared with a selected line number at comparator 75 to provide an enable signal on line 76 to storage register 81 in scanner 79. (As discussed above, the enable signal is only provided when a generated line number matches a selected line number.) When register 81 is thusly enabled and a DATA signal is stored in it, the DATA signal information is compared with information stored in pattern detector 83 to determine whether unique synchronizing information is present. Normally, pattern detector 83 determines whether synchronizing bits indicating valid VITC information is embedded in the DATA stored in register 81.

At this juncture, it can be appreciated that register 81 in scanner 79 is only enabled to read one certain selected line in a vertical blanking interval at any one time. Thus, it can be said that scanner 79 is controlled by comparator 75 to provide a "window" that is one line long for examining a particularly selected line in one or more sequential vertical blanking intervals. In practice, selected line numbers are determined in an ordered manner at the command of CPU 55 under conventional software control.

In normal operation of scanner 79 to identify VITC information, several iterations are usually necessary before VITC information is located at a selected line number. In other words, it is usually necessary for CPU 55 to select several line numbers to find the two redundant lines where VITC information is actually stored. Also in normal operation, because of the speed of tape transport, usually only one line at most is examined in each vertical blanking interval to determine whether the line contains valid VITC information; consequently, several vertical blanking intervals may be traversed before a particular line is detected in an interval as containing valid VITC information.

When scanner 79 identifies valid DATA information at a selected line in a vertical blanking interval, the data ready signal functions to cause transfer, via line 84, of the identified information to output registers of I/O register array 71. Also the data ready signal identifies via line 82, the presence of the number of the selected line to I/O register array 71 and to CPU 55. Then CPU 55 functions in a conventional manner to retain the identified line number in its internal memory. When these steps have been taken with respect to each of the two redundant lines of VITC information in a vertical blanking interval, the process of reading VITC information is essentially complete. Thus, it can be appreciated that the system in FIGS. 2 and 3 differs from conventional systems in that it not only identifies valid DATA (e.g., VITC information) but also identifies the particular line in vertical intervals upon which such information is written.

The process of writing VITC information is conventional and need not be described in detail except to note that the lines in vertical blanking intervals on which DATA information is written are selected by CPU 55. In an editing process, it is often convenient to select the line number for writing to correspond with the line numbers on which valid DATA information was previously located. In such a writing operation for VITC information during editing, a preparatory step is that CPU 55 generates an incremented frame number for VITC information so that numerically-sequential VITC information is available for writing. Further steps in the writing process include transferring the contents of selected output regiters in I/O register array 71 to multiplexer 85 and then to parallel-to serial converter 89. At converter 89, CRC and synchronization bit information is added to the transferred information, thereby generating a complete DATA signal. Further signal processing steps preparatory to recording are accomplished when the generated DATA signal is processed by filter 59, summer 60, modulator 62, and by record signal processor 63, and then is recorded on videotape 15 by read/write heads 14. Since memory in CPU 55 can retain the line number on which VITC information was detected in previously read vertical blanking intervals, CPU 55 can direct I/O register array 71 to write subsequent VITC information on the same detected lines. Further, the system of FIGS. 2 and 3 can operate to record numerically-sequential VITC information, if desired, on lines in vertical blanking intervals that are the same lines on which valid VITC information was detected. In the terminology of video-recording arts, the process of writing VITC information on identified lines in vertical blanking intervals may be called a "jam slave" process.

Although the present invention has been described with particular reference to the illustrated embodiments, the disclosure should not be interpreted as limiting. Various other alterations and modifications will no doubt become apparent to those skilled in the art after having read the preceding disclosure. For example, it should be clear from the foregoing discussion that the system of FIG. 2 and 3 can be utilized to write selected information other than VITC information at selected lines in a manner such that the information appears on the same lines as the lines on which the information was detected. In view of such variations, and others, it is intended that the appended claims be interpreted as covering all alternative embodiments and equivalents as fall within the spirit and scope of the present invention.

I claim:

1. A system for reading and writing vertical interval time code information on videotape wherein the videotape contains video information lines wherein some of the lines contain time code information including identifiers that establish the existence of time code information comprising:
   (a) scanning means to scan information lines within vertical blanking intervals on videotape;
   (b) control means for individually selecting the lines of video information to be scanned;
   (c) detector means to detect and identify the line numbers of scanned lines that contain time code information;
   (d) generator means to generate vertical interval time code information; and
   (e) writing means to write the generated vertical interval time code information in vertical blanking intervals only on lines that were detected and identified as containing the predetermined time code information.

2. A system as defined in claim 1 wherein the scanning means is controlled to define a window that is one line long.

3. A system as defined in claim 1 including a microprocessor-based central processing unit to select information lines to be individually scanned by the scanning means.

4. A system as defined in claim 3 wherein, in each blanking interval, one line at most is scanned.

5. A system as defined in claim 4 further including means to generate vertical interval line numbers.

6. A system as defined in claim 5 wherein said vertical interval line numbers are generated to, on average, lead the arrival of lines read from videotape by about one-half line and including means to synchronize said generated line numbers with information read from videotape.

7. A system as defined in claim 6 including a comparator means to provide an output to enable said scanning means to scan selected information lines only when a said synchronized line number is identical with a line number selected by said central processing unit.

8. A system as defined in claim 1 wherein said detector means includes a sync pattern detector means to identify whether information contained in a line scanned by the scanning means included unique synchronizing information.

9. A process for reading and inserting vertical interval time code information on videotape wherein the videotape contains video information lines wherein some of the lines contain time code information including identifiers that establish the existence of vertical interval time code information comprising the steps of:
   (a) reading information lines within vertical blanking intervals;
   (b) identifying the line numbers of ones of said lines in the vertical blanking intervals that contain the identifiers that establish the existance of vertical interval time code information;
   (c) generating time code information; and
   (d) writing the generated time code information onto videotape only at the identified ones of said lines.

10. A process as defined in claim 9 wherein the time code information is vertical interval time code information that is written after an edit transition numerically sequential with information prior to the edit transition and is written on said particularly identified lines in vertical blanking intervals.

11. A process as defined in claim 9, wherein, in each vertical blanking interval, one line at most is scanned.

12. A process as defined in claim 9 including the step of selecting the lines in vertical intervals on which to write time code information through a central processing unit.

13. A process according to claim 12 wherein the step of reading individually selected lines within vertical blanking intervals includes generating line numbers and reading a selected line only when a generated line number is identical with a line number selected by said central processing unit.

14. A process according to claim 12 wherein said time code information is generated only if information contained in a scanned line includes synchronizing information unique to vertical interval time code information.

* * * * *